INVENTOR.
WALTER C. LAMPHIER
BY
Roland A. Dexter
HIS ATTORNEY

United States Patent Office

2,858,492
Patented Oct. 28, 1958

2,858,492

ELECTRICAL CAPACITORS

Walter C. Lamphier, Williamstown, Mass., assignor to Sprague Electric Company, North Adams, Mass., a corporation of Massachusetts Application November 14, 1955, Serial No. 546,431

4 Claims. (Cl. 317—260)

This invention relates to electrical capacitors and more particularly to the metallized "self-healing" construction.

The metallized electrode capacitor construction has become well-known for its extreme lifetime and increased capacity per unit volume. In this type the electrode is of such a thinness that upon electrical breakdown of the dielectric of the capacitor the resulting surge of intense current flow volatilizes away the thin electrode or otherwise disrupts the film so as to isolate the fault from the electrodes of the capacitor, thus healing the flaw and allowing the unit to continue operation. Such construction is taught in the Dorn United States Patent No. 2,323,020, issued June 29, 1943. In the production of this capacitor type by automatic means much difficulty has been attendant with the attachment of the terminal lead wires by means of the sprayed metallic coating disposed upon the ends of the convolutely wound unit. Such a metal coating upon the end of the capacitor roll is shown in Fig. 1 of the above-referenced patent. In the deposition of this spray coating, there is substantial penetration of the metallic particles into the mandrel region of the wound condenser and often such penetration shorts the unit. Further, it should be noticed that the said Dorn patent teaches not the full coverage of the end of the capacitor with the sprayed coating, but rather it is masked in part so as to provide for subsequent entry of the dielectric impregnant. Such masking unnecessarily complicates the automatic production of this type of device.

It is therefore an object of this invention to overcome the foregoing and related disadvantages of the prior art so as to facilitate automatic production of metallized "self-healing" capacitors.

It is a further object of this invention to incorporate a unique impregnation channel into the construction of an end-sprayed metallized dielectric capacitor.

Other objects will be apparent from the following specification and appended claims.

According to the present invention a non-inductively convolutely wound capacitor is produced which has a plurality of electrodes separated with an impregnable dielectric spacer, at least a single turn of a porous dielectric spacer disposed in the mandrel opening of said convolutely wound capacitor and extending from at least one end of said capacitor, said extension of at least substantially the radius of said capacitor and disposed radially against the end of said capacitor, spray deposited terminal means disposed on the ends of said capacitor, said extension contiguous with said terminal means and said capacitor end. The further details of the invention will be apparent from the following description.

Referring to the accompanying drawing.

Metallized porous dielectric capacitors are generally produced in several ways. One way is to take two strips of metallized paper and wind them together with the metallization of one strip acting as one electrode and the metallization of the other strip acting as the other electrode. Each strip is margined at one edge so as to prevent shorting of the adjacent electrodes. When wound together the metallization of the one electrode is accessible to spraying with metal from a spray gun at one end of the roll, while the metal on the other paper strip which constitutes the other electrode is accessible to spraying at the opposite end of the roll. Another type of metallized capacitor is made from a single strip of metallized paper having alternate areas of metallization spread out along its length, which form, when the roll is wound, opposite portions of the capacitor. In this case, as in the former, the termination of the respective electrodes are accomplished by spraying the ends of the convolutely wound structure with metal. Although in Fig. 1 is shown the partially unwound construction referred to as the multiple paper construction, the invention of applicant is applicable to both.

Figure 1:
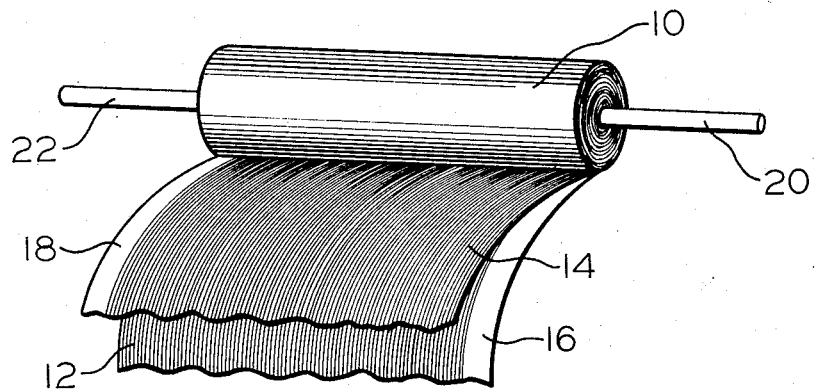
Fig. 1 is a partly unrolled metallized capacitor section.

In Fig. 1 the capacitor section 10 is a convolutely wound body of two separate metallized papers 12 and 14. The metallized coating is shown to be margined at regions 16 and 18, respectively, for the papers 12 and 14. Positioned in the mandrel region at the axis of the capacitor section 10 is the partially overlapping turn of paper 20 which extends to at least substantially the radius of the capacitor section 10 beyond the end face of the section. This turn of paper 20 should be at least substantially one with only a design limit on the maximum number of turns. You will note that Fig. 1 pictures the preferred structure for automatic operation wherein extension of the paper turn 20 is also found at 22, both extensions extending to at least substantially the radius of the section beyond their respective end faces. The dielectric spacer upon which the metallized layer is disposed can be of any material suitable as a dielectric that allows impregnation of the voids which exist between the adjacent capacitor electrodes onto which the dielectric field is imposed. Thus included are kraft paper, glass cloth, porous resins such as polytetrahaloethylene resin and polystyrene, etc. Such materials are also suitable as the dielectric spacer positioned within the mandrel. The capacitor electrodes are margined and wound in such a manner that non-inductive winding results. This means that the electrode is terminated substantially all the way along an outer edge rather than in a single region such as would be obtained with tab-type construction.

Figures 2, 3:
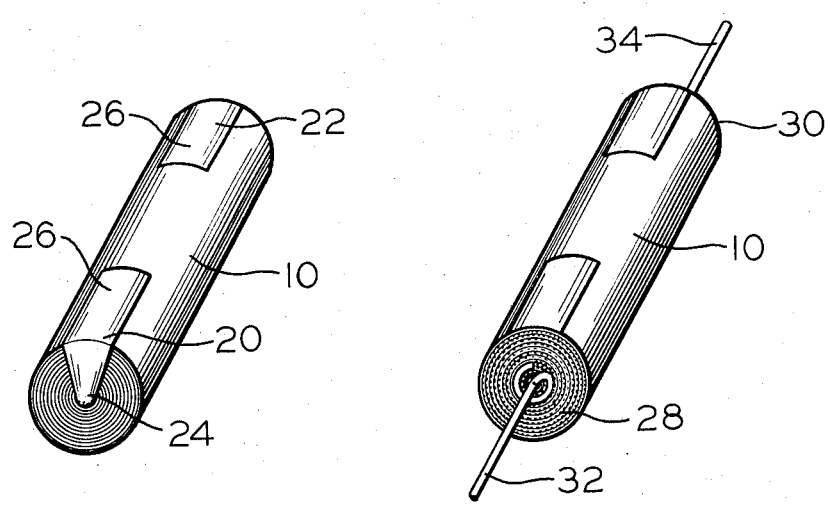
Fig. 2 is a perspective view of a fully rolled metallized capacitor construction.
Fig. 3 the metallized capacitor having sprayed ends with a terminal lead wire attached thereto.

The advantages of the invention will be readily seen by examination of Fig. 2, wherein is shown the non-inductively wound metallized capacitor with the porous dielectric extensions 20 and 22 bent over and imposed against the face of the end of the capacitor roll, section 10. It is desirable that the extensions 20 and 22 be substantially at least equal to the radius of the capacitor section 10 so as to reach to about the outer winding of the section 10, for in so doing the paper extension 20 and 22 additionally serves as an impregnating channel through which the impregnant can be transferred from outside into the interior of the capacitor section 10, even though the opposed faces of the capacitor section 10 are fully sprayed with metal particles. In radially disposing the extension 20 and 22 against the face of the end of the capacitor section 10, the metal deposited upon the end is prevented from projecting internally into the capacitor section particularly at the axis or mandrel region of the section which has been found highly susceptible to particle penetration. This penetration shorts the electrodes causing injury to or failure of the capacitor. Of course, this also happens at a similar point with section 22. During automatic operation in the assembly of the invention, the extensions 20 and 22 are secured to the outside of the wound section 10 by glue or other similar means at points 26. Within the scope of the invention is the utilization of only one extension, either 20 or 22 in the fabrication of the capacitor section 10. Such an extension would still provide the impregnation channel so as to allow impregnation of the internal portion of the capacitor section 10, while the mere persence of the porous dielectric in the mandrel region would prevent shorting at either end through penetration of the metallic particles. Even with spray deposited terminals at each end of the section, impregnation is possible though not as rapid.

The finished capacitor assembly is shown in Fig. 3, although it still remains to be impregnated and further processed as desired. In Fig. 3 the section 10 has at each end 28 and 30 a complete coating of sprayed metallic particles which terminate the active electrodes and facilitate electrical connection to the terminal lead wires 32 and 34. In this it is seen that extension 20 is contiguously disposed between the sprayed metal coating and the end of the capacitor section 10. It is certainly apparent that this construction allows impregnation without masking so as to facilitate impregnation.

The impregnants which can be used with the capacitor of the invention encompass all those generally known to the art as suitable for particular applications of electrostatic capacitors. These impregnants therefore include castor oil, saturated hydrocarbons such as mineral oil and mineral waxes, halogenated aromatic hydrocarbons such as chlorinated naphtholene wax and chlorinated diphenyl, synthetic linear hydrocarbon polymers such as polyisobutylene, and synthetic resins which may be either in liquid form or polymerized in situ to the solid state such as silicon oil, polystyrene as well as its copolymers, which copolymers might include polyalphamethylstyrene and a cross-linking agent as divinylbenzene, and polyesters of which there are many, but particularly those which are polymerizable in situ to the thermoset or highly cross-linked state. Such a polyester as exemplified by the copolymer of bisphenol, hexalene glycol, dibenzoic acid, and Itaconic acid in which there would be a slight more excess of bisphenol and the mole fraction of Itaconic acid of about 1¼ times greater than that of the saturated acid such as the dibenzoic. This polyester it is seen incorporates two polyhydroxy compounds and two polyfunctional acids, one of the polyhydroxy compounds having a substantial carbon chain length so as to improve the flexibility of the impregnant and the utilization of the excess of the unsaturated poly-functional acid so as to make available a substantial number of unsaturated bonds suitable for cross-linking.

As a specific example of the practice of this invention two strips of metallized paper of approximately 2 inches width and 0.25 mil thickness, having electrodes of zinc of a thickness of from about 4 to about 10 microns, were rolled into a convolutely wound structure. The metallized paper was margined to a depth of approximately ⅛ inch on one side while the metallized coating extended fully to the edge of the opposite side. Rolling was accomplished by disposing the two strips so that the margined edges were to opposed sides of the convolutely wound structure. Prior to the winding of the metallized paper strips, five turns of paper of 0.25 mil thickness and 3 inches in width were taken about the mandrel after which the metallized papers were rolled to a diameter of about ½ inch. The mandrel was removed and the initial turns of paper which extended approximately ½ inch from each end of the capacitor section were individually bent radially against the face of the end of the sections and folded back over onto the outer winding and secured there by means of an adhesive tape. The ends of the roll were sprayed with copper from a spray gun and a pig-tail terminal lead was secured by solder to each end of the capacitor section. Thereafter the units were impregnated by vacuum means with "Bareco Wax 190", a mineral hydrocarbon wax having a melting point of about 190° F.

Innumerable units of this type can be automatically produced without failure from shorts which is a marked contrast to previously assembled metallized capacitors. Further the capacitors produced in accordance with this invention show excellent electrical characteristics indicative that after impregnation substantially all the voids within the active dielectric are filled.

After the unit has been automatically assembled and the leads attached to the sprayed ends of the capacitor section, it is necessary to impose an external casing about the unit, which external casing may serve either to mechanically protect the unit which is impregnated with a thermostat resin or to maintain the impregnant within the active dielectric region by effectively sealing the capacitor section in the impregnant by means of the outer casing. Thus it is apparent that the encasement or container for the capacitor can be either of the resinous type such as molded or cast in an appropriate filled resin or hermetically sealed unit with a metallic container. Should it be desired to mold the unit or to cast the unit in a resin, it is often times desirable to impregnate the unit after the molded or cast casing is imposed about it. Prior to such molding or casting, it is preferable to impose several turns of porous dielectric spacer about the exterior of the unit so as to prevent entrance of the molding or casting resin into the capacitor proper and further provide a means for impregnation of the unit. The molding of the unit and subsequent impregnation requires an impregnation channel which may be of the conventional molded eyelet type or an alternative method is to leave an opening about at least one of the terminal lead wires during molding and after impregnation, cement the opening closed with a mineral filled resin of the epoxy type or other resin which could show suitable adherence both to the molded casing and the terminal lead wire. A further technique would be to use a premolded casing in combination with the filled epoxy resin cement for the closing of the opened end of the pre-molded casing. When the unit is housed in a metal can, a point of much concern often is the sealing of the lead wire to the outer metal housing by means of a suitable insulator. A very effective technique is to use a metal to glass seal, however this has been found of considerable cost and further, for high temperature application, and even more important for those applications where the units must be cycled from an extremely high temperature, for example 150° C. to a low temperature of say −60° C., these glass to metal seals occasionally fracture. An improved seal is to use a metal housing wherein an annular gasket of a resin such as polytetrafluoroethylene is used. This annular gasket of polytetrafluoroethylene resin would have distributed throughout it an inert insulator filter, for example copper silicate which will facilitate bonding of the insulating resin gasket to the housing as well as the central lead wire of the capacitor. Polytetrafluoroethylene resin, although extremely desirable, is notorious for the inherent difficulty of metallization, however it has been found that incorporation of various fillers including silica and the above referenced copper silicate makes possible its utilization.

As many apparently widely different embodiments of this invention may be made without departing from the spirit and scope hereof, it is to be understood that the invention is not limited to the specific embodiments hereof except as defined in the appended claims.

I claim:

1. A non-inductively convolutely wound capacitor having a plurality of electrodes separated by an impregnable dielectric spacer, at least a single turn of a porous dielectric spacer disposed in the mandrel region of said convolutely wound capacitor and extending from at least one end of said capacitor, said extension of at least the radius of said capacitor and radially disposed against the end of said capacitor, spray deposited terminal means disposed on the ends of said capacitor, the extent of said terminal means being less than the length of said extension, said extension contiguous with said terminal means of said one end.

2. The capacitor of claim 1 in which said porous dielectric material additionally extends on the other end of said mandrel region, said additional extension of at least the radius of said capacitor and radially disposed against said other end of said capacitor.

3. The capacitor of claim 1 wherein the porous dielectric spacer is paper.

4. A convolutely rolled capacitor section comprising two oppositely margined metallized dielectric layers, a porous dielectric material forming the innermost turns of said section and extending beyond the opposed ends of said section, said extensions being folded against said ends and onto the outer turn of said roll, and deposited metal terminal means covering said ends and the portions of said extensions which are folded against said ends.

References Cited in the file of this patent

UNITED STATES PATENTS 1,511,935    Bayles  ---------------- Oct. 14, 1924

FOREIGN PATENTS 619,364    Great Britain ----------- Mar. 8, 1949
716,917    Great Britain ---------- Oct. 20, 1954